United States Patent [19]

Kalchauer

[11] Patent Number: 5,250,646
[45] Date of Patent: * Oct. 5, 1993

[54] PROCESS FOR THE PREPARATION OF METALLOPOLYSILANES, AND THEIR USE

[75] Inventor: Wilfried Kalchauer, Burghausen, Fed. Rep. of Germany

[73] Assignee: Wacker-Chemie GmbH, Munich, Fed. Rep. of Germany

[*] Notice: The portion of the term of this patent subsequent to Nov. 24, 2009 has been disclaimed.

[21] Appl. No.: 767,583

[22] Filed: Sep. 30, 1991

[30] Foreign Application Priority Data

Nov. 20, 1990 [DE] Fed. Rep. of Germany ....... 4036988

[51] Int. Cl.$^5$ ...................... C08G 77/00; C08G 77/58
[52] U.S. Cl. ..................................... 528/14; 556/430; 528/395; 525/474; 525/475
[58] Field of Search .................. 556/430; 528/14, 395; 525/474, 475

[56] References Cited

U.S. PATENT DOCUMENTS

| | | | |
|---|---|---|---|
| 4,761,464 | 8/1988 | Zeigler | 528/30 |
| 4,762,895 | 8/1988 | Chandra et al. | 525/474 |
| 4,824,651 | 4/1989 | Frey et al. | 425/345 |
| 4,952,658 | 8/1990 | Kalchauer et al. | 528/34 |
| 5,166,287 | 11/1992 | Kalchauer et al. | 528/14 |

FOREIGN PATENT DOCUMENTS

| | | |
|---|---|---|
| 0270263 | 6/1988 | European Pat. Off. . |
| 0367497 | 5/1990 | European Pat. Off. . |

OTHER PUBLICATIONS

Patent Abstracts of Japan, vol. 8, No. 56, Mar. 14, 1984 and JP-A-58 213 023 (Ube Kosan), Dec. 10, 1983.

*Primary Examiner*—John C. Bleutge
*Assistant Examiner*—Margaret W. Glass

[57] ABSTRACT

A process for preparing metallopolysilanes, which comprises reacting at least one disilane of the general formula $$R_{6-n}Si_2(OR^1)_n \quad (I)$$

in which R may be the same or different and is a hydrogen atom or a monovalent hydrocarbon radical, $R^1$ is the same or different monovalent alkyl groups, and n is 2, 3, 4, 5 or 6, and optionally mixed with at least one compound of the general formula $$R^2_{4-m}Si(OR^4)_m \quad (II)$$

in which $R^2$ may be the same or different and is the same as R, $R^4$ may be the same or different and is the same as $R^1$, and m is 1, 2, 3 or 4, with at least one compound of the general formula $$(R^5O)[A(OR^5)_{a-2}O]_xR^5 \quad (III)$$

in which $R^5$ may be the same or different and is the same as $R^1$, A is a metal from group IIa, IIIa, IVa, Va, IIIb, IVb or Vb of the Periodic Table, x is an integer of from 1 to 1,000, and a represents the valency of A, in the presence of at least one compound of the general formula $$MOR^3 \quad (IV)$$

in which $R^3$ is the same as $R^1$, and M represents an alkali metal atom.

9 Claims, No Drawings

PROCESS FOR THE PREPARATION OF METALLOPOLYSILANES, AND THEIR USE

The invention relates to metallopolysilanes and more particularly to a process for preparing metallopolysilanes and their use.

BACKGROUND OF THE INVENTION

Processes for the preparation of metallopolysilanes have been disclosed, for example, in U.S. Pat. No. 4,762,895 (Dow Corning Corp., published on August 9, 1988). The patent describes a process for preparing a halogen-containing metallopolysilane by reacting a halodisilane and a metal compound in the presence of a catalyst. The halogen-containing metallopolysilane can be modified by suitable reactions, such as, for example, using a Grignard compound, but the metallopolysilane obtained in this manner usually has a certain halogen content, which generally has an adverse effect when used in the production of ceramics.

It is therefore an object of the present invention to provide a process for preparing metallopolysilanes.

SUMMARY OF THE INVENTION

The foregoing object and others which will become apparent from the following description is accomplished in accordance with this invention, generally speaking by providing a process for preparing metallopolysilanes, which comprises reacting at least one disilane of the general formula $$R_{6-n}Si_2(OR^1)_n \qquad (I)$$

in which R may be the same or different and is a hydrogen atom or a monovalent hydrocarbon radical, $R^1$ is the same or different monovalent alkyl groups, and n is 2, 3, 4, 5 or 6, and if desired mixed with at least one compound of the general formula $$R^2{}_{4-m}Si(OR^4)_m \qquad (II)$$

in which $R^2$ may be the same or different and is the same as R, $R^4$ may be the same or different and is the same as $R^1$, and m is 1, 2, 3 or 4, with at least one compound of the general formula $$(R^5O)[A(OR^5)_{a-2}O]_xR^5 \qquad (III)$$

where $R^5$ may be the same or different and is the same as $R^1$, A is a metal from group IIa, IIIa, IVa, Va, IIIb, IVb, or Vb of the Periodic Table, x is an integer of from 1 to 1,000, and a represents the valency of A, in the presence of at least one compound of the general formula $$MOR^3 \qquad (IV)$$

in which $R^3$ is the same as $R^1$, and M represents an alkali metal atom.

DESCRIPTION OF THE INVENTION

In formula (I) the radical represented by R is preferably a hydrogen atom or a hydrocarbon radical having from 1 to 12 carbon atoms.

Examples of radicals represented by R are alkyl radicals, such as the methyl, ethyl, n-propyl, isopropyl, n-butyl, isobutyl, tertbutyl, n-pentyl, isopentyl, neopentyl, and tert-pentyl radicals, hexyl radicals, such as the n-hexyl radical, heptyl radicals, such as the n-heptyl radical, octyl radicals, such as the n-octyl radical, and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical; alkenyl radicals, such as the vinyl or allyl radical; cycloalkyl radicals, such as cyclopentyl, cyclohexyl and cycloheptyl radicals, and methylcyclohexyl radicals; aryl radicals, such as the phenyl and naphthyl radicals; alkaryl radicals, such as o-, m- and p-tolyl radicals, xylyl radicals and ethylphenyl radicals; and aralkyl radicals, such as the benzyl radical and the α- and β-phenylethyl radicals.

The radical R is preferably the methyl, ethyl, phenyl, vinyl or allyl radical, and in particular the methyl or phenyl radical.

Examples of radicals represented by $R^1$ are the examples mentioned for the alkyl radicals of R.

The radical $R^1$ is preferably an alkyl radical having from 1 to 4 carbon atoms, preferably the methyl or ethyl radical, and in particular the methyl radical and n is preferably 2, 3 or 4, and more preferably 3 or 4.

Examples of disilanes of formula (I) which may be employed in the process of this invention are 1,2-phenyl-1,2-dimethyldimethoxydisilane, 1,1,2-trimethyltrimethoxydisilane, 1,1,2-trimethyltriethoxydisilane, 1-phenyl-1,2-dimethyltrimethoxydisilane, 1-phenyl-1,2-dimethyltriethoxydisilane, 1-vinyl-1,2-dimethyltrimethoxydisilane, 1-vinyl-1,2-dimethyltriethoxydisilane, 1,2-dimethyltetramethoxydisilane, 1,2-dimethyltetraethoxydisilane, methylpentamethoxydisilane, methylpentaethoxydisilane, methylpentaisopropoxydisilane, hexamethoxydisilane, hexaethoxydisilane and hexaisopropoxydisilane.

The disilanes employed in the process of this invention are preferably 1,2-phenyl-1,2-dimethyldimethoxydisilane, 1,1,2-trimethyltrimethoxydisilane, 1,1,2-trimethyltriethoxydisilane, 1-phenyl-1,2-dimethyltrimethoxydisilane, 1-phenyl-1,2-dimethyltriethoxydisilane, 1,2-dimethyltetramethoxydisilane and 1,2-dimethyltetraethoxydisilane.

The disilane of formula (I) employed in the process of this invention may be a single type of such a disilane or a mixture of at least two different types of such disilanes.

The preparation of disilanes is widely known. Reference is made to, for example, E. Hengge et al., Monatshefte für Chemie 105 (1974) 671–83 and 99 (1968) 340–6, and to W. H. Atwell et al., J. Organomet. Chem. 7 (1967) 71–8 and H. Watanabe et al., J. Organomet. Chem. 128 (1977) 173–5.

Examples of radicals represented by $R^2$ are the examples mentioned for R, in which $R^2$ is preferably the methyl, ethyl, n-propyl, isopropyl, n-butyl, isobutyl, n-octyl, vinyl or phenyl radical, and more preferably the methyl, vinyl or phenyl radical.

The radical represented by $R^4$ is preferably an alkyl group having from 1 to 4 carbon atoms, preferably the methyl or ethyl radical, and more preferably the methyl radical and m is preferably 2 or 3, and more preferably 2.

Examples of monosilanes of formula (II) are trimethylmethoxysilane, trimethylethoxysilane, triethylethoxysilane, vinyldimethylethoxysilane, tri-n-propylethoxysilane, triisopropylethoxysilane, tri-n-butyl-ethoxysilane, triphenylethoxysilane, ethylmethyldimethoxysilane, phenylmethyldimethoxysilane, vinylmethyldimethoxysilane, dimethyldiethoxysilane, ethylmethyldiethoxysilane, phenylmethyldiethoxysilane, vinylmethyldiethoxysilane, methyltrimethoxysilane, ethyltrimethoxysilane, phenyltriethoxysilane, propyltrimethoxysilane, vinyltrimethoxysilane, phenyltrimethoxysilane, methyltriethoxysilane, propyltriethoxysilane, vinyltriethoxysilane, propyltriethoxysilane, n-octyltriethoxysilane, isooctyltriethoxysilane, n-octyltrimethoxysilane, isooctyltrimethoxysilane and tetraethoxysilane.

Preferred monosilanes are phenylmethyldimethoxysilane, phenylmethyldiethoxysilane, phenyltrimethoxysilane and phenyltriethoxysilane, with phenylmethyldimethoxysilane being the more preferred monosilane.

The silane of formula (II) employed in the process of this invention may be a single type of such a silane or a mixture of at least two different types of such silanes.

The preparation of silanes of formula (II) is described by, for example, W. Noll, "Chemistry and Technology of Silicones", Academic Press, London (1968), pages 68 ff.

In the process of this invention, the silane of formula (II) is preferably employed in amounts of from 0 to 40 percent by weight, and more preferably from 10 to 20 percent by weight, based on the total weight of the disilane employed.

The radical represented by $R^5$ is preferably an alkyl group having from 1 to 6 carbon atoms, preferably the methyl, ethyl, i-propyl or n-butyl radical, and more preferably the i-propyl or n-butyl radical.

In formula (III) A is preferably beryllium, magnesium, calcium, strontium, barium, yttrium, lanthanum, aluminum, titanium, zirconium, hafnium, germanium, niobium, tantalum, arsenic or antimony and more preferably A represents titanium, zirconium or aluminum and x is preferably an integer between 1 and 700, and more preferably between 1 and 500.

Examples of compounds of formula (III) are magnesium ethoxide, calcium methoxide, calcium i-propoxide, strontium i-propoxide, barium i-propoxide, yttrium(III) i-propoxide, aluminum n-butoxide, aluminum n-propoxide, aluminum ethoxide, aluminum i-propoxide, titanium(IV) n-propoxide, titanium(IV) n-butoxide, titanium(IV) ethoxide, titanium(IV) methoxide, titanium(IV) i-propoxide, zirconium(IV) n-butoxide, zirconium(IV) ethoxide, zirconium(IV) n-propoxide, hafnium(IV) t-butoxide, hafnium(IV) ethoxide, hafnium(IV) i-propoxide, germanium(IV) ethoxide, lanthanum(III) i-propoxide, niobium(V) ethoxide, tantalum(V) ethoxide, tantalum(V) methoxide, antimony(V) n-butoxide, antimony(V) ethoxide and antimony(V) methoxide, in which x = 1, and polytitanium(IV) n-butoxide and polytitanium(IV) n-propoxide, in which x = 2 to 500.

The compound of formula (III) in the process of this invention is preferably titanium(IV) n-butoxide, polytitanium(IV) n-butoxide, titanium(IV) n-propoxide, polytitanium(IV) n-propoxide, zirconium(IV) ethoxide, zirconium(IV) n-butoxide, zirconium(IV) n-propoxide, aluminum i-propoxide and aluminum n-butoxide.

The preferred compound of formula (III) which is used in the process of the invention, is titanium(IV) n-butoxide, polytitanium(IV) n-butoxide, titanium(IV) n-propoxide, zirconium(IV) n-propoxide, aluminum n-butoxide or zirconium(IV) n-butoxide.

The compound of formula (III) employed in the process of this invention may be a single type of such a compound or a mixture of at least two different types of such compounds.

The compounds of formula (III) employed in this invention are commercial products or they can be prepared by techniques known in organic chemistry.

In the process of this invention, the compound of formula (III) is preferably employed in amounts of from 0.2 to 10 percent by weight, more preferably from 1 to 7 percent by weight, and in particular from 1 to 5 percent by weight, based on the total weight of the disilane employed.

Examples of radicals represented by $R^3$ are the examples mentioned for the radical $R^1$.

The radical represented by $R^3$ is preferably the methyl, ethyl or tert-butyl radical and more preferably the methyl or tert-butyl radical. M in formula (IV) is preferably lithium, sodium, potassium, rubidium or cesium, with sodium and potassium being the preferred.

Examples of compound of formula (IV) employed as catalyst in the process of this invention are sodium methoxide, sodium ethoxide, sodium tert-butoxide, potassium tert-butoxide and potassium methoxide.

In the process of this invention, the catalyst employed is preferably sodium methoxide, sodium ethoxide, sodium tert-butoxide or potassium tert-butoxide, and more preferably the catalyst is sodium methoxide or potassium tert-butoxide.

In the process of this invention, the catalyst is preferably employed in amounts of from 0.03 to 2.5 percent by weight, and more preferably from 0.05 to 0.8 percent by weight, based on the total weight of the disilane employed.

The catalysts employed in the process of this invention may be a single type of such a catalyst or a mixture of at least two different types of such catalysts.

In the process of this invention, the reaction is carried out under an inert atmosphere, such as, for example, under a nitrogen or argon atmosphere, after the reactants and the catalyst have been mixed at temperatures preferably between 20° and 280° C., and more preferably between 60° and 230° C., and at a pressure preferably between 900 and 1,100 hPa. If desired, however, higher or lower pressures can also be used. In the process of this invention, the volatile constituents which are produced, such as, for example, monomeric silanes, are preferably removed from the reaction mixture by distillation during or after the reaction and more preferably during the reaction.

The process of this invention gives metallopolysilanes having an average of up to 15 silicon atoms and a mean molecular weight of between 500 and 1,000, the molecular weight distribution being substantially monomodal and symmetrical. The softening point for the metallopolysilanes prepared according to this invention is preferably in the range from 20° to 150° C.

The process of this invention has the advantage that it can be carried out in one step and is relatively simple and produces metallopolysilanes which are free from Si-bonded halogen atoms.

The process of this invention has the added advantage that the chemical and physical properties of the metallopolysilane can be controlled within broad limits through a suitable choice of the reaction conditions.

The metallopolysilanes prepared according to this invention can be employed for all purposes for which it was possible to employ metallopolysilanes or organopolysilanes and organopolycarbosilanes heretofore.

The metallopolysilanes prepared according to this invention are preferably used in processes for the production of silicon carbide (SiC) fibers.

SiC fibers and processes for their production are well known. SiC fibers are predominantly produced from polysilanes or polycarbosilanes. All these processes have the common feature of spinning of a suitable polymer with subsequent crosslinking and pyrolysis under an inert gas or in vacuo.

In a preferred process, for SiC fibers, are prepared from metallopolysilanes of this invention by spinning the metallopolysilanes to form fibers and then reacting the fibers under an inert atmosphere or in vacuo at temperatures in the range of from 800° to 1,400° C.

Preferred temperatures are in the range of from 1,000° to 1,300° C. and preferred inert gases are argon and nitrogen.

Spinning of the metallopolysilanes to form fibers is carried out by known processes, such as dry spinning, wet spinning or melt spinning, but preferably by melt spinning. In this process, fibers preferably having a mean diameter of from 10 to 60 $\mu$m are spun from the melt and crosslinked by exposure to heat, light, such as, for example, UV light, steam and/or oxygen, but in particular air. The crosslinked fibers can be drawn under an inert gas or in air at temperatures of from 50° to 400° C.

The SiC fibers produced using the metallopolysilanes prepared according to this invention have the advantage of very good mechanical properties.

SiC fibers are principally used in fiber-composite materials, preferably in fiber-composite materials whose matrix comprises a ceramic, such as SiC or $Si_3N_4$, glass or a metal, such as, for example, aluminum or titanium.

The metallopolysilanes of this invention are also employed in processes for the preparation of silicon carbide (SiC) or SiC ceramics by heating the metallopolysilanes prepared according to this invention to temperatures above 600° C. under an inert atmosphere, such as, for example, under argon, helium or nitrogen atmospheres, or in vacuo.

In a preferred process for preparing porous SiC ceramics, metallopolysilanes prepared according to this invention are mixed with SiC powders, pressed to form compacts and reacted under an inert atmosphere or in vacuo at a temperature in the range from 700° to 2,200° C.

Preferred temperatures are in the range of from 900° to 1,500° C. and preferred SiC powders have a mean particle size of from 0.1 to 100 $\mu$m, and more preferably from 0.4 to 50 $\mu$m. It is preferred to use from 25 to 95 percent by weight, and more preferably from 50 to percent by weight, based on the weight of the metallopolysilane employed, of SiC powder.

Pressing assistants, in particular flow aids, in amounts of from 0.01 to 5 percent by weight, in particular from 0.2 to 1 percent by weight, based on the weight of SiC powder employed, are preferably added to the mixture comprising metallopolysilane and SiC powder. Flow aids are described, for example, in Aldinger, Kalz; Angew. Chemie 5, 381, 1987. In particular, glycerol, ammonium stearate or a polyethylene glycol is used.

The mixing of the metallopolysilane of this invention with the SiC powder and, if used, with the pressing assistant is preferably carried out by dissolving the metallopolysilane in an organic solvent and mixing the solution with the additional components. Preferred solvents are aromatic or aliphatic hydrocarbons, such as toluene, xylene or petroleum ethers of various boiling fractions, in amounts of, preferably, from 10 to 99 percent by weight, and more preferably from 35 to 55 percent by weight, based on the mixture.

The solvent is subsequently removed, preferably at a temperature of from 50° to 200° C. and at a pressure of from 10 to 1,000 Pa. The residue which remains is comminuted and screened. The powder obtained in this manner, preferably having a maximum particle size of 500 $\mu$m, and more preferably 200 $\mu$m, is pressed to form a compact using a press, if desired at elevated temperature. This can be carried out under an inert gas atmosphere, in air or in vacuo.

The porous silicon ceramics of this invention are employed, in particular, in filtration technology. By reducing the particle sizes and the particle size distribution of the SiC powders employed and also the SiC powder to metallopolysilane ratio, the pore sizes and pore size distribution in the ceramics can be adjusted. One of the advantages of SiC filter plates is that organic filtration residues can easily be removed by oxidation without simultaneously destroying the ceramic filter.

In addition, the metallopolysilanes prepared according to this invention can be employed in processes for the production of protective coatings based on silicon carbide. These coatings on metallic and nonmetallic surfaces are thermally and chemically stable.

In a preferred process for the production of protective coatings based on silicon carbide, metallopolysilanes prepared according to this invention, preferably mixed with SiC powder and an organic solvent, are applied to the substrate to be protected and are reacted under an inert atmosphere, such as, for example, under an argon or nitrogen atmosphere, or in vacuo, at temperatures in the range from 700° to 1,500° C., or under a reactive atmosphere, such as, for example, in an oxygen-containing gas mixture, at temperatures of from 200° to 700° C.

Preferred mixtures comprise from 10 to 80 percent by weight, preferably from 15 to 40 percent by weight, of metallopolysilane prepared according to this invention, from 10 to 80 percent by weight, preferably from 20 to 50 percent by weight, of an SiC powder having a mean particle size distribution of from 0.1 to 20 $\mu$m, preferably from 0.3 to 5 $\mu$m, and from 10 to 80 percent by weight, preferably from 15 to 60 percent by weight, of an organic solvent, such as aliphatic and aromatic hydrocarbons, perferably toluene, xylene and petroleum ethers of various boiling fractions.

The application of the coating can be carried out in any manner suitable for the application of liquid or pasty substances to substrates, for example by dipping, spraying, spreading, pouring or rolling.

After application, the coating is preferably dried for from 15 minutes to 2 hours at temperatures of, preferably, from 10° to 200° C. under an inert or reactive atmosphere.

The protective coatings produced according to this invention preferably have a thickness of from 2 to 2,000 $\mu$m, in particular from 2 to 50 $\mu$m. They are used, in particular to produce thermally and chemically resistant surface coatings on metals, ceramics, glass ceramics, fiber materials and carbon.

In the following examples, all parts and percentages are by weight, unless otherwise stated. Unless otherwise stated, the reactions described in Examples 1 to 5 are carried out under an argon atmosphere at a pressure of about 1,020 hPa and at room temperature, i.e. at about 23° C., or at the temperature prevailing when the reactants are combined at room temperature without additional heating or cooling. Unless otherwise stated, Examples 6 to 8 are carried out under ambient conditions, i.e. at a pressure of about 1,000 hPa and at room temperature.

The weight average molecular weight $M_w$ and the number average molecular weight $M_n$ are determined from the corresponding GPC chromatograms using a polystyrene standard.

Example 1

A mixture containing 725 g of 1,1,2-trimethyltrimethoxydisilane, 275 g of 1,2-dimethyltetramethoxydisilane and 25 g of poly-n-butyl titanate(IV) ($M_n=950$, $M_w=1,060$, monomodal distribution; commercially available from Johnson Matthey GmbH and Alfa Products) is warmed to 60° C. About 4 g of sodium methoxide are then added, during which the mixture warms to 67° C. without external heating. The mixture is subsequently warmed to 205° C., during which 755 g of a mixture of methyltrimethoxysilane and dimethyldimethoxysilane distill off. About 260 g of a blue-gray residue are obtained and, in order to remove undesired oligomers, are dissolved in 300 g of petroleum ether having a boiling range of from 170° to 200° C. The solvents and oligomers are subsequently distilled off at 250° C. and 10 Pa. About 200 g of residue are obtained which is a blue-black metallopolysilane that softens at about 30° C. and has a number average molecular weight $M_n$ of 600 and a weight average molecular weight $M_w$ of 1,000. The molar ratio between the methyl groups, methoxy groups and butoxy groups is, according to the $^1$H-NMR spectrum, 100:7.5:1.0. The resultant metallopolysilane is pyrolized in a furnace at a heating rate of 10° C./minute, with a final temperature of 1,250° C. The residue thus obtained has the elemental composition indicated in Table 1.

Example 2

A mixture containing 580 g of 1,1,2-trimethyltrimethoxydisilane, 420 g of 1,2-dimethyltetramethoxydisilane, 25 g of poly-n-butyl titanate(IV) ($M_n=950$, $M_w=1,060$, monomodal distribution; commercially available from Johnson Matthey GmbH and Alfa Products) and 100 g of dimethoxymethylphenylsilane are warmed to 40° C. About 2.8 g of sodium methoxide are then added, during which the mixture warms to 46° C. without external heating. The mixture is subsequently warmed to 210° C., during which time 818 g of a mixture of methyltrimethoxysilane and dimethyldimethoxysilane distill off. About 270 g of a blue-gray residue are obtained, which, in order to remove undesired oligomers, are dissolved in 300 g of petroleum ether having a boiling range of from 170° to 200° C. The solvents and oligomers are subsequently distilled off at 250° C. and 10 Pa. About 215 g of a blue-black metallopolysilane are recovered which softens at about 35° C. and has a number average molecular weight $M_n$ of 700 and a weight average molecular weight $M_w$ of 1,500. The molar ratio between methyl groups, methoxy groups, phenyl groups and butoxy groups is, according to the $^1$H-NMR spectrum, 100:15.7:4.1:1.6. The resultant metallopolysilane is treated in accordance with the procedure of Example 1. The elemental composition is given in Table 1.

Example 3

A mixture containing 1,000 g of 1,2-dimethyltetramethoxydisilane, 100 g of dimethoxymethylphenylsilane and 25 g of poly-n-butyl titanate(IV) ($M_n=950$, $M_w=1,060$, monomodal distribution; commercially available from Johnson Matthey GmbH and Alfa Products) is warmed to 80° C. About 1.5 g of sodium methoxide are then added, during which the mixture warms to 83° C. without external heating. The mixture is subsequently warmed to 220° C., during which time 851 g of methyltrimethoxysilane distill off. About 250 g of a blue-gray residue are obtained, which, in order to remove undesired oligomers, are dissolved in 250 g of petroleum ether having a boiling range of from 170° to 200° C. The solvents and oligomers are subsequently distilled off at 250° C. and 10 Pa. About 190 g of a blue-black metallopolysilane are recovered which softens at about 85° C. and has a number average molecular weight $M_n$ of 850 and a weight average molecular weight $M_w$ of 1,750. The molar ratio between methyl groups, methoxy groups, phenyl groups and butoxy groups is, according to the $^1$H-NMR spectrum, 100:35.9:3.3:2.1. The metallopolysilane obtained in this way is treated in accordance with Example 1. The elemental composition is given in Table 1.

Example 4

A mixture containing 1,000 g of 1,2-dimethyltetramethoxydisilane, 140 g of 1,2-dimethyl-1,1,2-trimethoxyphenyldisilane and 35 g of tetra-n-propyl titanate (commercially available from Merck, D-6100 Darmstadt) is warmed to 70° C. About 1.8 g of sodium methoxide are then added, during which the mixture warms to 83° C. without external heating. The mixture is subsequently warmed to 225° C., during which time 845 g of methyltrimethoxysilane distill off. About 300 g of a blue-gray residue are obtained, which, in order to remove undesired oligomers, are dissolved in 350 g of petroleum ether having a boiling range of from 170 to 200° C. The solvents and oligomers are subsequently distilled off at 250° C. and 10 Pa. About 250 g of a blue-black metallopolysilane are recovered which softens at about 80° C. and has a number average molecular weight $M_n$ of 850 and a weight average molecular weight $M_w$ of 1,750. The molar ratio between methyl groups, methoxy groups, phenyl groups and propoxy groups is, according to the $^1$H-NMR spectrum, 100:33.7:7.8:1.9. The metallopolysilane obtained in this way is treated in accordance with Example 1. The elemental composition is given in Table 1.

Example 5

A mixture containing 1,000 g of 1,2-dimethyltetramethoxydisilane, 85 g of 1,2-dimethoxy-1,2-dimethyl-1,2-diphenyldisilane and 40 g of zirconium(IV) n-propoxide (commercially available from Strem Chemical GmbH, D-7640 Kehl) is warmed to 65° C. About 2.4 g of sodium methoxide are then added, during which the mixture warms to 73° C. without external heating. The mixture is subsequently warmed to 240° C., during which time 868 g of methyltrimethoxysilane distill off. About 230 g of a blue-gray residue are obtained, which, in order to remove undesired oligomers, are dissolved in 200 g of petroleum ether having a boiling range of from 170° to 200° C. The solvents and oligomers are subsequently distilled off at 250° C. and 10 Pa. About 185 g of metallopolysilane are recovered which softens at about 115° C. and has a number average molecular weight $M_n$ of 800 and a weight average molecular weight $M_w$ of 1,800. The molar ratio between methyl groups, methoxy groups, phenyl groups and propoxy groups is, according to the ¹H-NMR spectrum, 100:34.3:10.3:2.0. The metallopolysilane obtained in this way is treated in accordance with Example 1. The elemental composition is given in Table 1.

TABLE 1

| Ex. | Residue [%][1] | Si [%] | C [%] | H [%] | Ti [%] | Zr [%] |
|---|---|---|---|---|---|---|
| 1 | 38–45 | 60–64 | 26–30 | 0.0–0.5 | 2.1–2.8 | 0 |
| 2 | 40–47 | 58–63 | 29–33 | 0.0–0.5 | 2.1–2.8 | 0 |
| 3 | 45–58 | 58–63 | 28–34 | 0.0–0.5 | 2.1–2.8 | 0 |
| 4 | 45–58 | 58–63 | 28–34 | 0.0–0.5 | 1.0–1.5 | 0 |
| 5 | 45–58 | 55–60 | 29–36 | 0.0–0.5 | 0 | 1.0–1.5 |

[1]based on the weight of metallopolysilane employed

Example 6

The metallopolysilanes prepared in Examples 3, 4 and 5 are each warmed in a melt spinning unit to a temperature from 50 to 80° C. above the respective softening point of the metallopolysilanes, and spun at from 4 to 20 bar through a 100 μm perforated die and through a 300 μm perforated die, the takeoff rate being varied in the range of from 35 to 200 m/minute. Depending on the spinning conditions chosen, the fibers have individual filament diameters in the range from 15 to 60 μm. The fibers are irradiated in the presence of atmospheric oxygen for from 1 to 5 days with UV-A light (380–315 nm) and subsequently for 10 seconds with UV-C light (280–100 nm). The resultant fiber bundles have good tear strength and flexibility. They are subsequently post-crosslinked for 30 minutes in air at up to 180° C. and then drawn continuously at a tension of from 0.5 to 2.0 g at a rate of 0.5 m/minute through an argon-flushed tubular furnace at 1,250° C. with a 0.25 m heating zone.

The resultant SiC fibers have a mean composition of:
Silicon: from 46 to 55 percent by weight
Carbon: from 22 to 29 percent by weight
Oxygen: from 17 to 28 percent by weight
Titanium: from 0 to 2.8 percent by weight
Zirconium: from 0 to 1.5 percent by weight
Hydrogen: from 0 to 0.5 percent by weight
The tensile strength of the resultant SiC fibers is, depending on their diameter,
0.5–0.8 GPa at 50 μm,
0.6–1.3 GPa at 30 μm and
2.4–3.9 GPa at 10 μm.

The tensile strength values are retained for at least one hour at temperatures up to about 1,100° C. in air and up to about 1,250° C. under an inert atmosphere.

Example 7

About 160 g of a metallopolysilane prepared in accordance with Example 1 or 2 are each mixed and stirred vigorously with 250 g of xylene and 75 g of silicon carbide having a maximum particle size of 20 μm.

Test rods made of CFC (carbon fiber reinforced carbon), graphite, iron and steel are each coated with this composition and heated in an argon-flushed furnace at a heating rate of 10° C./h to 1,100° C. in the case of CFC and graphite test rods and to 800° C. in the case of iron and steel rods, maintained at this temperature for 1.5 hours and subsequently cooled.

All eight test rods have a uniform, firmly adherent silicon carbide coating with a mean thickness of between 40 and 60 μm.

Example 8

Test rods made of CFC, graphite, iron and steel are each coated with the composition described in Example 7, heated to 300° C. at a heating rate of 1° C./minute in the presene of air in a furnace, kept at this temperature for 1.5 hours and subsequently cooled.

All eight test rods have a uniform, strongly adherent, hydrophobic, elastic coating with a mean thickness of between 40 and 60 μm.

What is claimed is:

1. A process for preparing metallopolysilanes, which consists essentially of reacting at least one disilane of the general formula $$R_{6-n}Si_2(OR^1)_n \qquad (I)$$

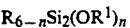

in which R is selected from the group consisting of a hydrogen atom and a monovalent hydrocarbon radical, $R^1$ is a monovalent alkyl group, and n is 2, 3, 4, 5 or 6, and optionally mixed with at least one compound of the general formula $$R^2{}_{4-m}Si(OR^4)_m \qquad (II)$$

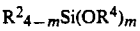

in which $R^2$ is is a monovalent hydrocarbon radical having from 1 to 12 carbon atoms, $R^4$ is the same as $R^1$, and m is 1, 2, 3 or 4, with at least one compound of the general formula $$(R^5O)[A(OR^5)_{a-2}O]_xR^5 \qquad (III)$$

where $R^5$ is the same as $R^1$, A is a metal selected from the group consisting of IIa, IIIa, IVa, Va, IIIb, and Vb of the Periodic Table, x is an integer of from 1 to 1,000, and a represents the valency of A, in the presence of at least one compound of the general formula $$MOR^3 \qquad (IV)$$

in which $R^3$ is the same as $R^1$, and M is an alkali metal atom.

2. The process of claim 1, wherein the disilane of formula (I) is mixed with at least one compound of the general formula $$R^2{}_{4-m}Si(OR^4)_m \qquad (II)$$

in which $R^2$ is a monovalent hydrocarbon radical having from 1 to 12 carbon atoms, $R^4$ is a monovalent alkyl group and m is 1, 2, 3 or 4.

3. The process of claim 1, wherein n in formula (I) is 2, 3 or 4.

4. The process of claim 2, wherein m in formula (II) is 2 or 3.

5. The process of claim 2, wherein n in formula (I) is 2, 3 or 4.

6. The process of claim 1, wherein the silane of formula (II) is employed in an amount of from 0 to 40 percent by weight, based on the total weight of the disilane employed.

7. The process of claim 1, wherein A in formula (III) represents a metal selected from the group consisting of titanium, zirconium and aluminum.

8. The process of claim 1, wherein the compound of formula (III) is employed in an amount of from 0.2 to 10 percent by weight, based on the total weight of the disilane employed.

9. The process of claim 1, wherein the compound of formula (IV), is employed in an amount of from 0.03 to 2.50 percent by weight, based on the total weight of the disilane employed.

* * * * *